GEORGE LITTLE.
Improvement in Chemical Telegraphs
No. 4,532. Reissued Aug. 29, 1871.
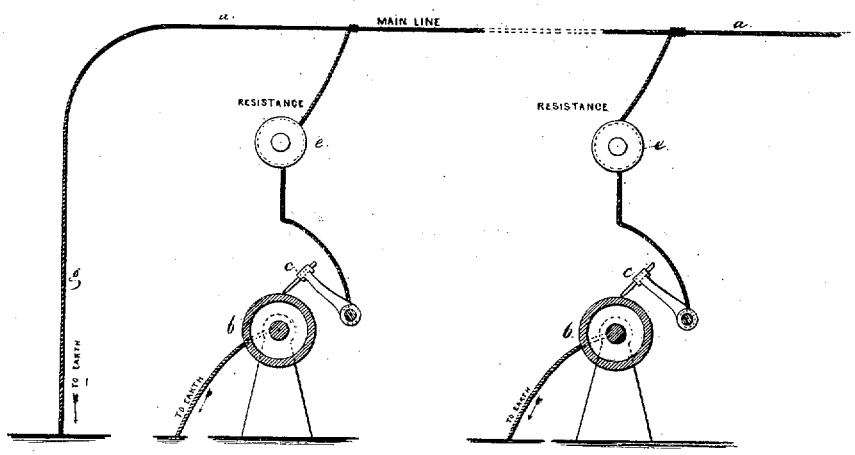
Witnesses
Chas. H. Smith
Geo. T. Pomeroy
George Little.
L. W. Serrell
atty.
THE NORRIS PETERS CO., PHOTO-LITHO., WASHINGTON, D. C.

UNITED STATES PATENT OFFICE.

GEORGE LITTLE, OF RUTHERFORD PARK, NEW JERSEY.

IMPROVEMENT IN TELEGRAPH APPARATUS.

Specification forming part of Letters Patent No. 108,496, dated October 18, 1870; reissue No. 4,532, dated August 29, 1871.

*To all whom it may concern:*

Be it known that I, GEORGE LITTLE, of Rutherford Park, in the county of Bergen and State of New Jersey, have invented an Improvement in Circuits for Telegraph Instruments; and the following is declared to be a correct description thereof.

Chemical telegraphs in which the mark is made on a strip or surface of paper by a stilus have usually only been worked at the end of a main line, because provision had not been made whereby drop copies or several copies could be made on one main line. Recently derived circuits or shunts have been employed in the line-wire of the main circuit for effecting this object.

My improvement as distinguished from the devices which have preceded it relates to an arrangement for diverting a portion of the main current, employing the same for operating the receiving instrument, and returning the same through the earth-circuit while the other portion of the current proceeds to the distant station. By this means the main circuit is subdivided and the current passes off by leakages, or in detail sufficient for operating the receiving instrument, and only so much of the current is employed as is necessary where each copy of the message is taken, and the remainder returns by the earth-circuit.

In the drawing I have represented a diaphragm illustrative of the improvement. The wire *a* represents the main line from one station to another. The receiving instruments are shown at *b c*, where *b* represents the roller, and *c* the stilus of any chemical telegraph, which, being well known, require no further description. The receiving instrument at each station where a drop copy is to be taken is in a branch or leakage circuit between the main line *a* and the ground. The pulsations of electricity from the sending station will pass through a short circuit in preference to a long circuit if the conducting power is uniform; hence if several telegraphs were connected to the main line without a resistance or rheostat in the branch circuit, the pulsations would pass almost if not exclusively through the first instrument, to avoid which a resistance is to be introduced, as at *e*, in the branch line, and this resistance is to be proportioned by any of the well-known adjustable means, so that only the amount of galvanic electricity necessary to operate the receiving instrument is allowed to pass or leak from the main circuit to make the drop copy at the desired stations, the other portion of the current proceeding to the distant station, and at the last station any surplus electricity may pass to the earth by the connection shown at *g*.

The resistance may be a coil, a column of mercury, or any other device that is adapted to the purpose, and I prefer to employ a resistance that is adjustable or variable, so as to proportion the resistance to the current.

By the use of several branch or leakage circuits connected to the earth the main line is cleared of surplus electricity with much greater rapidity than in the arrangements heretofore employed; and hence with a chemical telegraph the mark will be more distinct, and in cases where desired a resistance and leakage circuit to the earth may be employed to clear the wire, even when a receiving instrument is not employed.

I claim as my invention—

1. A branch circuit, connected with the main line and the earth, in which are placed the receiving telegraph and a resistance, substantially as and for the purposes set forth.

2. A branch circuit and resistance, connected from the main line to the earth, for clearing the wire of surplus electricity, substantially as set forth.

Signed by me this 4th day of August, A. D. 1871.

GEORGE LITTLE.

Witnesses:

GEO. D. WALKER,

GEO. T. PINCKNEY.

(31.)